(12) United States Patent
Simons et al.

(10) Patent No.: US 7,283,238 B2
(45) Date of Patent: Oct. 16, 2007

(54) METHOD AND APPARATUS FOR MATCHING COLOURS

(75) Inventors: Paul R. Simons, Redhill (GB); Duncan F. McPherson, Aberdeen (GB)

(73) Assignee: Kokninklijke Philips Electronics N.V., Eindhoven (NL)

( * ) Notice: Subject to any disclaimer, the term of this patent is extended or adjusted under 35 U.S.C. 154(b) by 200 days.

(21) Appl. No.: 10/525,140

(22) PCT Filed: Aug. 6, 2003

(86) PCT No.: PCT/IB03/03479

§ 371 (c)(1),
(2), (4) Date: Feb. 16, 2005

(87) PCT Pub. No.: WO2004/018984

PCT Pub. Date: Mar. 4, 2004

(65) Prior Publication Data

US 2005/0275842 A1    Dec. 15, 2005

(30) Foreign Application Priority Data

Aug. 21, 2002 (GB) ................. 0219479.3

(51) Int. Cl.
  *G01N 21/25* (2006.01)
  *G01J 3/28* (2006.01)
(52) U.S. Cl. .............. 356/402; 356/405; 356/326
(58) Field of Classification Search .......... 356/319, 356/328, 402–406, 421, 425, 408; 250/226; 700/83; 702/196
See application file for complete search history.

(56) References Cited

U.S. PATENT DOCUMENTS

| | | | | |
|---|---|---|---|---|
| 5,272,518 A | * | 12/1993 | Vincent | 356/405 |
| 5,483,339 A | * | 1/1996 | Van Aken et al. | 356/326 |
| 5,668,633 A | * | 9/1997 | Cheetam et al. | 356/402 |
| 5,995,650 A | | 11/1999 | Migdal et al. | |
| 6,043,893 A | | 3/2000 | Treiman et al. | |
| 6,157,454 A | | 12/2000 | Wagner et al. | |
| 6,349,300 B1 | | 2/2002 | Graf et al. | |
| 6,584,435 B2 | * | 6/2003 | Mestha et al. | 702/196 |
| 6,640,145 B2 | * | 10/2003 | Hoffberg et al. | 700/83 |
| 2001/0044801 A1 | | 11/2001 | Senn et al. | |

FOREIGN PATENT DOCUMENTS

EP     1217346 A1    6/2002

* cited by examiner

Primary Examiner—Gregory J. Toatley, Jr.
Assistant Examiner—Iyabo S. Alli
(74) Attorney, Agent, or Firm—Yan Glickberg

(57) ABSTRACT

A portable color sampling device (10) facilitates comparison of a color sampled from an object using an optical sensor (11) with a database (30,42,43,44) of stored colors. The database (30,42,43,44) of stored colors includes a merchandise database of articles for sale, and an indication of the location of those articles, including an indication of some or all of retailer identity, store location, in-store location, article description or product ID, class of article and the like. A user points the color sampling device at an article to be sampled, and a color definition data file is generated for transmission to a database of articles. The database returns to the sampling device a list of merchandise that matches the sampled color or colors and any other matching criteria such as class of article, product code, and geographic proximity.

15 Claims, 1 Drawing Sheet

METHOD AND APPARATUS FOR MATCHING COLOURS

Figure 1:
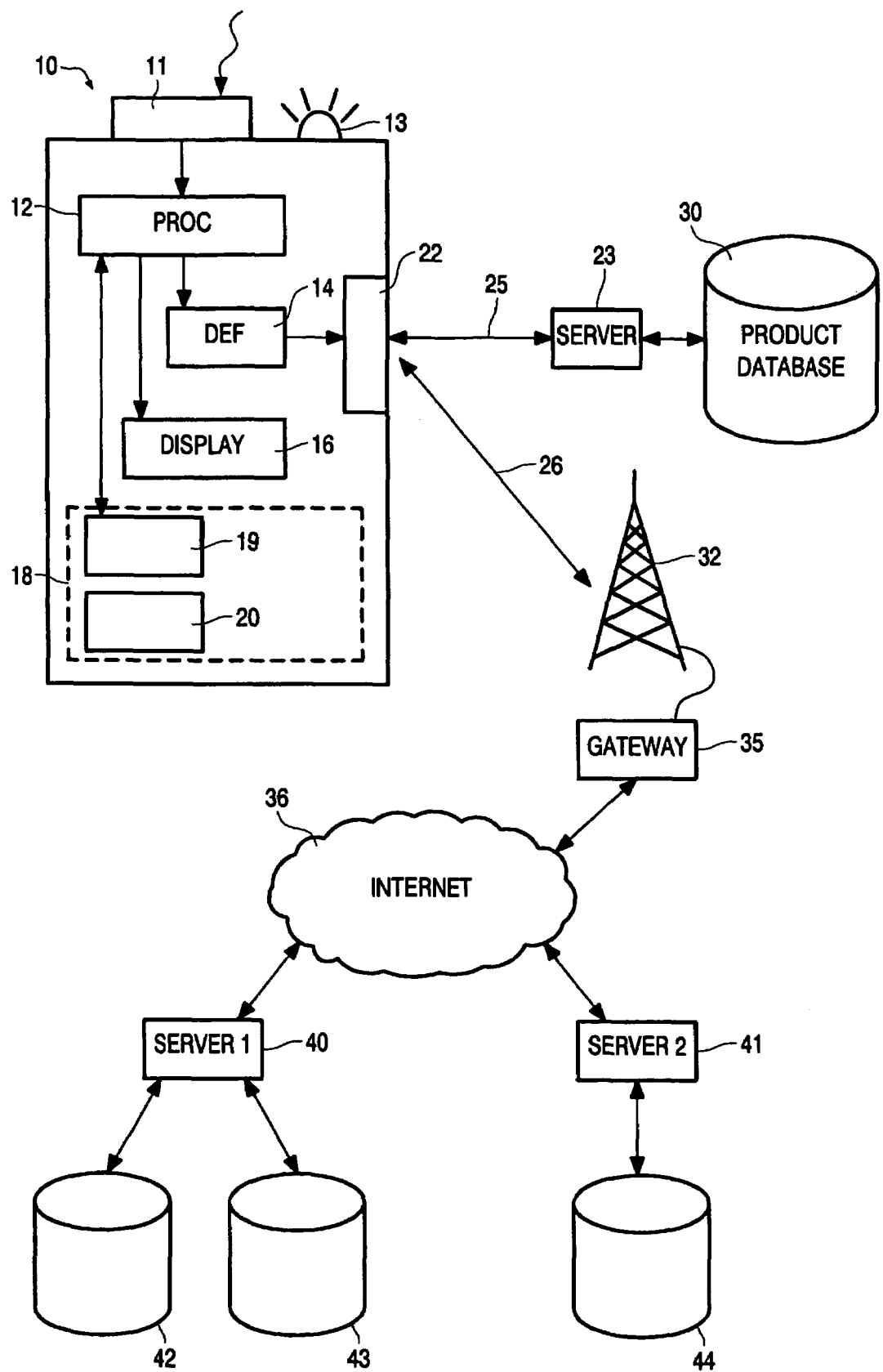

The present invention relates to colour sampling devices, and in particular to methods and apparatus for matching sampled colour data with databases containing colour data.

There are many occasions in which it is desirable for a person to be able to accurately match colours of objects. This can be quite difficult to achieve by eye, particularly where the objects to be matched have different textures or materials, or where lighting levels are inconsistent. Often, the matching has to be achieved from memory, without simultaneous direct visual contact with the two items to be matched, which many people find difficult.

For example, it is a common requirement when purchasing home furnishings (including furniture, carpets, curtains, wallpaper, paint and the like) to try to match the colours of those home furnishings with existing colour schemes in a room in which they will be placed. Typically, this can only be accurately achieved by obtaining from the retailer a colour sample (such as a swatch, fabric cutting or match pot of paint, for example) and taking this colour sample home, prior to deciding on the purchase.

In another example, it is a common requirement when purchasing clothing for a person to find articles that match or complement existing items in their wardrobe, or that match the person's "ideal colours", as often specified by a style consultant. For example, many people make use of a personal colour bureau that generates a custom palette of colours suited to an individual's hair, eye and/or skin colours. Searching for the appropriate clothing items can be time consuming, requiring visits to many clothing retailers in order to find appropriate items.

Many colour sampling devices are known in the art. For example, U.S. Pat. No. 6,157,454 describes a calorimeter for measurement of the colour of an object. The calorimeter comprises a pen-shaped probe with a probe tip, which measures reflectance of the object at the wavelength of the three primary colours to then determine a colour value by reference to a look-up table of stored reflectance ratios.

U.S. Pat. Nos. 6,043,893 and 5,483,339 both describe portable reflectance spectrophotometers for determining levels of each spectral component of an object. US '339 also proposes an interface to a computer for transferring a set of colour standards to the spectrophotometer and for transferring measurement data from the spectrophotometer.

U.S. Pat. No. 5,995,650 describes a portable system for measuring shape, contour, colour and other data relating to an object by rapid scanning of the object with a geometric light shape.

US 2001/44801 describes a system for producing an electronic colour information data file for communication of colour data describing one or more colour samples to a receiver, such that the receiver can display the colour. In particular, the system may incorporate in the data file not only colourimetric data, but also specify colour exchange format, device dependent colour data, surface condition and graininess of the object and the like.

It is an object of the present invention to provide a portable device for locating items having a predetermined colour or colours. It is a further object of the present invention to provide a portable device that is able to sample colours from the environment and then access a search engine for locating details of products or articles that meet colour matching requirements.

It is a further object of the present invention to provide a portable device that is able to sample colours from the environment and then determine a quantitative degree of matching with a colour palette stored therein.

According to one aspect, the present invention provides a method of colour matching comprising the steps of:

sensing colour information representative of an article being sampled, with a portable user device having an optical sensor;

generating a colour definition data file from said colour information;

transmitting said colour definition data file to a remote database;

searching the database for data items that match colour criteria indicated by the transmitted colour definition data;

generating a list of said data items; and transmitting said list of data items to the user device.

Optionally, the sensing step includes directing a digital camera to at least a portion of the article to form an image thereof and defining a target region of the image for which target region the colour information is to be sampled. In this case the method may further include the step of determining an average of the sensed colour information or a representative colour set, for use in generating the colour definition data file.

Optionally, the sensing step further includes determining a temperature of the light illuminating the colour image. In this case, the step of generating a colour definition data file can also include incorporating temperature of the light illuminating the image that produced the colour definition data file.

The method may also include the step of storing a plurality of said colour definition data files relating to different articles for later transmission to the remote database.

The article being sampled may be, for example, any one of an article of clothing, an article of furniture, a colour sample chart or swatch, a fabric, a carpet, curtain material, wallpaper or paint.

The method can further include the step of displaying, on the portable user device, the list of data items.

Optionally, each data item includes data identifying an article available for purchase. Optionally, each data item may also include data identifying a location of the article available for purchase.

The method may further include the step of transmitting an indication of location of the user device to the remote database.

The method may further include the step of transmitting, with the colour definition data file, an indication of a class of articles to which the colour defined in the definition file is to be matched.

The method may further include the step of transmitting, with the colour definition data file, an indication of a category of article to which the colour defined in the definition file is to be matched.

Optionally, the remote database is installed in a retail store, and the step of generating a list of data items comprises generating a list of articles available for sale in the retail store that match colour criteria indicated by the transmitted colour definition data.

According to another aspect, the present invention provides a method of colour matching comprising the steps of:

sensing colour information representative of an article being sampled, with a portable user device having an optical sensor;

generating a colour definition data file from said colour information;

transmitting said colour definition data file to a remote database;

receiving from the remote database a list of one or more data items each relating to an article that matches colour criteria indicated by the transmitted colour definition data; and providing as output to a user the one or more data items in the list on the portable user device.

The method may further include the steps of:

receiving product location information with each of the received data items; and providing as output said product location information on the portable user device.

According to another aspect, the present invention provides a method of colour matching comprising the steps of:

receiving a colour definition data file, including colour information representative of a sampled article, from a portable user device;

searching a database for data items that match colour criteria indicated by the transmitted colour definition data;

generating a list of one or more data items each relating to an article that matches colour criteria indicated by the received colour definition data file; and transmitting said list of data items to the user device.

The method may further include the step of transmitting, to the user device, product location information in respect of data items in the list.

According to another aspect, the present invention provides a method of colour matching using a portable colour matching device, comprising the steps of:

sensing colour information representative of the colour of an article being sampled with an optical sensor;

generating a colour definition data file from said colour information;

storing a plurality of colour definition data files relating to previously sampled objects;

receiving a colour definition data file relating to a current sampled article, and searching colour definition data files in the memory to determine if any of the stored files match colour criteria indicated by the colour definition data for a current sample; and providing as output on the colour matching device an indication if any stored files match the colour criteria.

According to another aspect, the present invention provides a portable colour sampling device comprising: an optical sensor for sensing colour information representative of the colour of an article being sampled;

means for generating a colour definition data file from said colour information;

a wireless transmitter for transmitting said colour definition data file to a remote database; and a wireless receiver for receiving, from said remote database, a list of data items that match colour criteria indicated by the transmitted colour definition data.

The optical sensor may comprise a digital camera.

In this case the camera may include a visual targeting device enabling the user to determine a portion of an image of an article for which the colour information will be generated. The sampling device may further include means for determining an average of the sensed colour information or a representative colour a representative colour set, for incorporation into the colour definition data file.

The optical sensor may further include means for determining the temperature of the light used to illuminate the colour image. In this case the means for determining a temperature of the light illuminating the image may include an illumination device.

The device can further include means for reading a product barcode. The sampling device can further include means for storing a plurality of said colour definition data files for later transmission to a remote database.

The sampling device can further include a display for displaying said list of data items.

The sampling device can further include an audio output device for presenting said list of items to the user.

The transmitter and receiver of the sampling device may comprise a mobile telephony device.

The transmitter and receiver of the sampling device may comprise a Bluetooth device.

The sampling device may further include means for transmitting, with the colour definition data file, an indication of current location of the sampling device.

The sampling device may further include means for transmitting, with the colour definition data file, an indication of a class of articles to which the colour defined in the definition file should be matched.

According to another aspect of the present invention there may be provided a personal digital assistant or mobile telephone incorporating the sampling device.

According to another aspect, the present invention provides a colour matching server comprising:

means for receiving, from a portable colour sampling device a colour definition data file indicating sensed colour information representative of the colour of an article;

a database of data items, each data item relating to an article and one or more colour properties of that article;

a search engine for receiving the colour definition data file and locating, in the database, data items that match colour criteria indicated by the transmitted colour definition data;

means for generating a list of said data items; and means for transmitting said list of data items to the portable colour sampling device.

The means for transmitting and the means for receiving may comprise a mobile telephony device.

The means for transmitting and the means for receiving may comprise a Bluetooth device.

Each data item may further include data identifying an indication of retail location of the respective article.

Optionally, the data items relate to articles comprising any one or more of: an article of clothing, an article of furniture, a colour sample chart or swatch, a fabric, a carpet, curtain material, wallpaper or paint.

The colour matching server can be installed in a retail store.

According to another aspect, the present invention provides a portable colour sampling device comprising:

an optical sensor for sensing colour information representative of the colour of an article being sampled;

means for generating a colour definition data file from said colour information;

a memory for storing a plurality of colour definition data files relating to previously sampled objects;

a comparison engine for receiving a colour definition data file relating to a current sampled article, and for searching colour definition data files in the memory to determine any of the stored files which match colour criteria indicated by the colour definition data for a current sample; and means for indicating determined stored files that match the colour criteria.

The means for indicating may include means for indicating a quantitative degree of closeness of match to the colour definition data of the current sample.

The means for indicating may comprise a visual display and/or an audio output.

Embodiments of the present invention will now be described by way of example and with reference to the accompanying drawing in which:

FIG. 1 shows a schematic block diagram of a colour sampling device and networked connection to a colour matching server according to the present invention.

With reference to FIG. 1, a portable colour sampling device 10 includes an optical sensor 11 adapted to sense colour information representative of the colour of an article being sampled. Preferably, the optical sensor 11 is a digital camera, although any form of calorimeter or spectrophotometer device could also be used. The colour sampling device 10 further includes a suitable data processing device 12 which generates a colour definition data file 14 for each article sampled.

The colour definition data file 14 incorporates all the information necessary and sufficient to define the colour of the article to a required degree of accuracy. Many different colour definition protocols are known in the art—many of these are discussed in US 2001/0044801—which may be used in preferred embodiments of the present invention. A preferred colour definition protocol uses RGB colour values derived from the digital camera 11. The RGB protocol offers a convenient 24-bit number representation which is useful for electronic storage and transmission.

In the preferred embodiment, where the optical sensor 11 is a digital camera, the sampling device 10 preferably also includes a viewfinder (not shown) for imaging the surface of the article in view. The viewfinder may incorporate a visual targeting device, such as a cross-hair or "box" in the viewfinder which indicates a portion of the imaged article for which colour information will be generated for inclusion into the colour definition data file 14. The colour sampling area may include a predetermined number of pixels of the imaging device (eg. at least 100) in order to ensure a representative mix of colours and hues to form an averaged single sample that is properly representative of the article. For instance it may reduce a colour set to the 8 most common colours.

The processing device 12 may provide an averaging process for determining a suitable colour average from colour information received in respect of a portion of an imaged article. Thus, an image of an article may be captured having a complex array of colours from the portion, and RGB values may be extracted therefrom to produce a range of colours that represent the article.

Color quantisation methods known in the art can also be used to reduce the number of colours in the image by producing an optimised set of representative colours for inclusion into the colour definition data file. In another embodiment it may be desired to represent a sample set to a single colour. In some instances this could be matched to the name of a colour or the name of a product colour (eg. a brand-specific paint colour name). This colour may then be more easily used for database searching.

The colour sampling device 10 may include a colour correction system for determining the conditions under which the colour data was collected. The processing device 12 may then correct the colour data according to a predefined colour correction standard common to all sampling devices. Alternatively, the processing device 12 may store data identifying the conditions in respect of which correction should be made with the colour definition data file. In this way, correction can be performed remotely from the device 10 when colour matching operations are being performed.

Thus, the sampling device effectively incorporates means for determining the temperature of the light illuminating the sampled article.

In a simplest form, this means for determining temperature of the light may be an illumination device provided in the form of a flash unit 13, for which the specific temperature is known, and this temperature may be incorporated into the stored colour definition data files.

The colour sampling device 10 preferably also provides a display device 16. This may be a simple, text only display device, or more preferably a display having colour graphics capabilities. Where the colour sampling device 10 has determined that there are several colours in the object, or portion of the object, being sampled, the display device 16 may be used to display a list or a colour palette of all colours in the sample. The user may then view these colours and decide which should be used to generate the colour definition data file 14. This may be important where the object being samples contains a mix of disparate colours (eg. a tweed jacket). The image processing device 12 may determine and display the range of colours in the sample, and possibly also resolve the image to a selection of key colours.

The colour sampling device 10 preferably includes a memory 18 capable of storing a number of colour definition data files 19, 20 for future use or reference. These could, for example, correspond to an individual user's "ideal colour palette" which can be stored by sampling each one of the specified colours from a printed colour palette.

The colour sampling device 10 further includes a transmitter/receiver device 22 (hereinafter "transceiver") suitable for the transmission of colour definition data files through an access point 23 to a remote database 30 over a communication channel 25, and for receiving data from the database 30. The transceiver 22 may be any suitable wireless transmission system.

In preferred embodiments, the colour sampling device is integrated into a mobile telephone handset, a personal digital assistant (PDA) or other mobile computing device.

In one arrangement, a short range communication channel 25 may be used, and the transceiver may be a Bluetooth device or the like that communicates with a local server/database 30.

In another arrangement, a longer range mobile telephony transceiver is used over a GSM or GPRS communications channel 26, for example. In this arrangement, the colour sampling device 10 communicates with a network gateway device 35 via telephony cell transceiver 32, which forwards communications to and from one or more servers 40, 41 over a suitable network 36. The network 36 may be the internet or a suitable wide area network (WAN) or local area network (LAN).

Each one of the networked servers 40, 41 may provide access to one or more databases 42, 43, 44.

Each of the databases 30, 42 . . . 44 stores information relating to a plurality of data items each having associated colour definition data for matching against colour criteria derived from or contained in colour definition data files 14 transmitted from the colour sampling device 10. Each of the plurality of data items preferably relates to an object or article of merchandise available from an associated retail outlet. These objects may be any one of an article of clothing, an article of furniture, a carpet, curtain material, or paint, or any other object having an associated colour.

The database preferably includes, associated with each data item, an indication of the retailer's identity, the store location, and possibly also the location of the merchandise within the store. This may be effected by storing a product code with each data item which can be cross-referenced with a retailer's database. Thus, it will be understood that the databases 30, 42 . . . 44 may in fact be distributed databases.

A typical mode of use of the system of FIG. 1 will now be described. A user of the colour sampling device 10 may point the device at an object whose colour is to be matched with another object, and initiate a colour capture process by the optical sensor 11 and data processor 12. For example, the user may capture the colours of walls in his or her home, existing furniture or clothing, carpets, curtains and the like, or each of the colours on his or her personal colour palette. Each of these colours is captured and stored in the memory 18 as a colour definition data file 19, 20, preferably together with an associated memory tag or label identifying the source of the colour.

Preferably, the user is also able to input further data for association with the colour definition data file. This further data may identify a category of article or class of articles to which the data relates, and/or a category of article for which a colour match is desired. For example, the user may store colour definition data file 19 with a memory tag indicating that the colour relates to a skirt already owned by the user. The user may also add data relating to article matching criteria, for example, defining that the user seeks a jacket in a matching colour.

The user may then initiate a transmission of one or more colour definition data files, together with the article matching criteria, to the database 30. Using an appropriate search engine, the database provides, in return, a list of articles that have the requisite colour, and details of the location where they may be found.

The location data may include a retailer ID, a location in a retail store, or a product code for furnishing to a shop assistant, or a web site address and product code for the purposes of on-line shopping.

The data returned from the database 30 may be displayed on the display device 16. According to the bandwidth of the communication channel and complexity of the display, the returned data may be a simple text message directing the user to a specified shop, together with a suitable product code, or may provide a graphical representation of the matched articles available, together with retailer address and a map or other location finder.

Alternatively, the database may supply to the user's colour sampling device 10 a synthesised voice message providing the necessary information. This is particularly useful where the colour sampling device is integrated into a mobile telephone handset.

In another aspect, the colour matching device could be used during a shopping trip to enter the article matching criteria. For example, the user may find a pair of trousers in the desired style, but fail to find the colour being sought. The colour definition data file 19 already stored in the device 10 may then be transmitted to the database 30 together with article matching criteria derived from the (wrong coloured) article in view. This may be achieved by providing a category of article, such as by way of a product barcode. Preferably, the product barcode could be obtained by way of a barcode reading facility in the colour sampling device 10. The product barcode will therefore identify the style required, and the colour definition data will provide the colour required. It will be recognised that this product barcode reader may be the same optical sensor 11 as used in the colour sampling.

In another example of use, the scope of the database search may be automatically restricted to a given retailer or department within a retailer by providing a geographical indication of the location of the user. The geographic location of the user's colour sampling device could be provided in a number of ways.

For example, the colour sampling device 10 may be programmed by the user to add data indicating the town or city in which they are shopping, or a postcode region. The device 10 may be provided with an automatic location indicator such as by a GPS receiver.

Alternatively, location may be implied through the communications channel in use. Where a short range (eg. Bluetooth) communications channel 25 is being used, a retail store may provide a number of Bluetooth receivers in each department throughout the store. The colour definition data file received from the sampling device 10 may then effectively include an implied geographical specification for the scope of the product search, and thereby limit the list of data items that match colour criteria indicated by the transmitted colour definition data returned to the sampling device 10.

In an implementation using a mobile telephony communications channel 26, a geographical extent of search may be implied from identification of the network cell 32 transceiver that received the transmission. The database 30, 42 . . . 44 may then be able to restrict the list of data items that match colour criteria indicated by the transmitted colour definition data to those within a predetermined radius of the location of the user.

In another embodiment, the colour sampling device may be used in a different manner. As described before, the colour sampling device 10 includes a memory 18 for storing a number of colour definition data files 19, 20 relating to articles sampled by the device. These files may include a users ideal colour palette. In use, a shopper when viewing clothing articles in a store may use the colour sampling device 10 to simply verify a colour of a clothing article against one or more stored colour definition files within the device.

Where a sampled colour matches one of the stored colour definition data files, the device may display the match, or the nearness of match on the display 16. This assists the user in coordinating colours and provides an electronic mechanism for approving a match. The device may include a process for determining an index of merit indicating a closeness of match, or a degree of complement between, a sampled colour and each of a set of stored colour definition data files.

The colour sampling device 10 may be adapted to provide a name to each sampled colour, which name can be displayed or voice synthesised, to be of assistance to colour blind, blind or partially sighted persons.

Other embodiments are intentionally within the scope of the accompanying claims.

The invention claimed is:

1. A method of colour matching comprising the steps of:
    sensing colour information representative of an article being sampled, with a portable user device having an optical sensor;
    generating a colour definition data file from said colour information;
    transmitting said colour definition data file to a remote database;
    searching the database for data items that match colour criteria indicated by the transmitted colour definition data file;
    generating a list of said data items; and
    transmitting said list of data items to the user device.

2. The method of claim 1 in which the sensing step includes directing a digital camera to at least a portion of the article to form an image thereof and defining a target region of the image for which target region the colour information is to be sampled.

3. The method of claim 2 further including determining an average of the sensed colour information or a representative colour set, for use in generating the colour definition data file.

4. The method of claim 1 in which the sensing step further includes determining a temperature of the light illuminating the colour image.

5. The method of claim 4 in which the step of generating a colour definition data file includes incorporating temperature of the light illuminating the image that produced the colour definition data file.

6. A method of colour matching comprising the steps of:
sensing colour information representative of an article being sampled, with a portable user device having an optical sensor;
generating a colour definition data file from said colour information;
transmitting said colour definition data file to a remote database;
receiving from the remote database a list of one or more data items, each relating to an article that matches colour criteria indicated by the transmitted colour definition data file; and
providing as output to a user the one or more data items in the list on the portable user device.

7. The method of claim 6 further including the steps of: receiving product location information with each of the received data items; and providing as output said product location information on the portable user device.

8. A method of colour matching comprising the steps of:
receiving from a portable user device a colour definition data file including colour information representative of a sampled article and an indication of current location of the portable user device;
searching a database for data items that match colour criteria indicated by the received colour definition data file;
generating a list of one or more data items each relating to an article that matches colour criteria indicated by the received colour definition data file; and
transmitting said list of data items to the user device, wherein each data item includes data identifying an indication of retail location of the respective article.

9. A method of colour matching using a portable colour matching device, comprising the steps of:
sensing colour information representative of the colour of an article being sampled with an optical sensor;
generating a colour definition data file from said colour information;
storing a plurality of colour definition data files relating to previously sampled objects;
receiving a colour definition data file relating to a current sampled article, and searching colour definition data files in the memory to determine if any of the stored files match only colour criteria indicated by the colour definition data file for a current sample; and
providing as output on the colour matching device an indication if any stored files match the colour criteria.

10. A portable colour sampling device comprising:
an optical sensor for sensing colour information representative of the colour of an article being sampled;
means for generating a colour definition data file from said colour information;
a wireless transmitter for transmitting said colour definition data file to a remote database; and
a wireless receiver for receiving, from said remote database, a list of data items that match colour criteria indicated by the transmitted colour definition data file.

11. The sampling device of claim 10 in which the optical sensor further includes means for determining the temperature of the light used to illuminate the colour image.

12. The sampling device of claim 10 further including means for transmitting, with the colour definition data file, an indication of current location of the sampling device.

13. A colour matching server comprising:
means for receiving, from a portable colour sampling device a colour definition data file indicating sensed colour information representative of the colour of an article;
a database of data items, each data item relating to an article and one or more colour properties of that article;
a search engine for receiving the colour definition data file and locating, in the database, data items that match only colour criteria indicated by the received colour definition data file;
means for generating a list of said data items; and
means for transmitting said list of data items to the portable colour sampling device.

14. The colour matching server of claim 13 in which each data item further includes data identifying an indication of retail location of the respective article.

15. A portable colour sampling device comprising:
an optical sensor for sensing colour information representative of the colour of an article being sampled;
means for generating a colour definition data file from said colour information; a memory for storing a plurality of colour definition data files relating to previously sampled objects;
a comparison engine for receiving a colour definition data file relating to a current sampled article, and for searching colour definition data files in the memory to determine any of the stored files which match colour criteria indicated by the colour definition data for a current sample; and
means for indicating determined stored files that match the colour criteria.

* * * * *